(12) United States Patent
Huebner et al.

(10) Patent No.: US 10,106,092 B2
(45) Date of Patent: Oct. 23, 2018

(54) EXPANDABLE AND RECONFIGURABLE CONSOLE

(71) Applicant: FORD GLOBAL TECHNOLOGIES, LLC, Dearborn, MI (US)

(72) Inventors: Annette Lynn Huebner, White Lake, MI (US); Ryan Welch, Ottawa Lake, MI (US); Kristin Ann Hellman, Walled Lake, MI (US); Artur Stanislavovich Sakarian, Ann Arbor, MI (US); Joshua Hamilton Greiner, Detroit, MI (US); Matthew B. Rutman, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/428,388

(22) Filed: Feb. 9, 2017

(65) Prior Publication Data
US 2018/0222394 A1    Aug. 9, 2018

(51) Int. Cl.
*B60R 7/04*    (2006.01)
(52) U.S. Cl.
CPC ..................... *B60R 7/04* (2013.01)
(58) Field of Classification Search
CPC .............. B60R 7/04; B60R 7/046; B60N 3/10
USPC ............................................. 296/24.34, 37.8
See application file for complete search history.

(56) References Cited

U.S. PATENT DOCUMENTS

| | | | |
|---|---|---|---|
| 6,435,587 B1 * | 8/2002 | Flowerday | B60N 3/08 220/345.5 |
| 6,942,267 B1 | 9/2005 | Sturt | |
| 7,434,859 B2 * | 10/2008 | Mulvihill | B60R 7/04 224/400 |
| 8,505,997 B2 | 8/2013 | Hipshier et al. | |
| 8,517,443 B2 * | 8/2013 | Hipshier | B60R 7/04 296/24.34 |
| 2010/0066113 A1 | 3/2010 | Browne et al. | |
| 2010/0133866 A1 | 6/2010 | Hipshier | |
| 2011/0068598 A1 * | 3/2011 | Penner | B60R 7/04 296/37.8 |
| 2016/0193967 A1 | 7/2016 | Hipshier et al. | |

FOREIGN PATENT DOCUMENTS

| | | | |
|---|---|---|---|
| FR | 2490197 | * | 3/1982 |
| WO | 2008064210 A2 | | 5/2008 |
| WO | 2016094621 A1 | | 6/2016 |

* cited by examiner

*Primary Examiner* — Dennis H Pedder
(74) *Attorney, Agent, or Firm* — Vichit Chea; King & Schickli, PLLC

(57) ABSTRACT

A center console includes a base and a bin supported on the base. The bin has a first section and a second section that define a variable volume storage compartment.

17 Claims, 7 Drawing Sheets

US 10,106,092 B2

EXPANDABLE AND RECONFIGURABLE CONSOLE

TECHNICAL FIELD

This document relates generally to the motor vehicle equipment field and, more particularly, to an expandable console that may be reconfigured in a variety of ways to meet the needs of any particular application.

BACKGROUND

In the majority of motor vehicles available today, the center console area between the front seats of a motor vehicle contains a storage bin, one or more cup holders and an open or closed storage tray near the instrument panel. While useful, this center console configuration does not allow the motor vehicle operator to customize this area of the vehicle for different usage scenarios or applications.

This document relates to a new and improved console that is expandable and reconfigurable. That console includes a variable volume storage compartment as well as various adjustable partitions as well as one or more doors. That new and improved console is easy to use and provides versatile performance that may be tailored or customized by the vehicle operator as desired. Further, the console may be used as a center console between the front seats of a motor vehicle or for other applications including, for example, between second row seats or at other locations in a motor vehicle.

SUMMARY

In accordance with the purposes and benefits described herein, a console is provided. That console comprises a base and a bin supported on the base. The bin has a first section and a second section defining a variable volume storage compartment. The base may include a recessed storage compartment.

The base may include a first guide track. The first section of the bin may engage and slide along that first guide track between a first position, defining a first storage compartment volume, and a second position defining a second storage compartment volume.

The base may include a first sidewall and a second sidewall. The bin, including the first and second sections thereof, may be supported on the base between the first sidewall and the second sidewall.

The first section may comprise a first U-shaped wall. The second section may comprise a second U-shaped wall. In addition the first section may include a first partition. The first section may also include a first door. The second section may include a second partition. The second section may also include a second door. The partitions may be adjustable. The first door may slide in a second guide track carried on the first U-shaped wall and the second door may slide in a third guide track carried on the second U-shaped wall. Further, the doors may be made to open in opposed directions.

The first partition may include a first retractable bin floor. The second partition may include a second retractable bin floor. The first retractable bin floor may slide along a fourth guide track in the first section of the bin. The second retractable bin floor may slide along a fifth guide track in the second section of the bin. Both the first retractable bin floor and the second retractable bin floor may be made from a plurality of articulating segments.

In the following description, there are shown and described several preferred embodiments of the console. As it should be realized, the console is capable of other, different embodiments and its several details are capable of modification in various, obvious aspects all without departing from the console as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the console and together with the description serve to explain certain principles thereof.

Figure 3A:
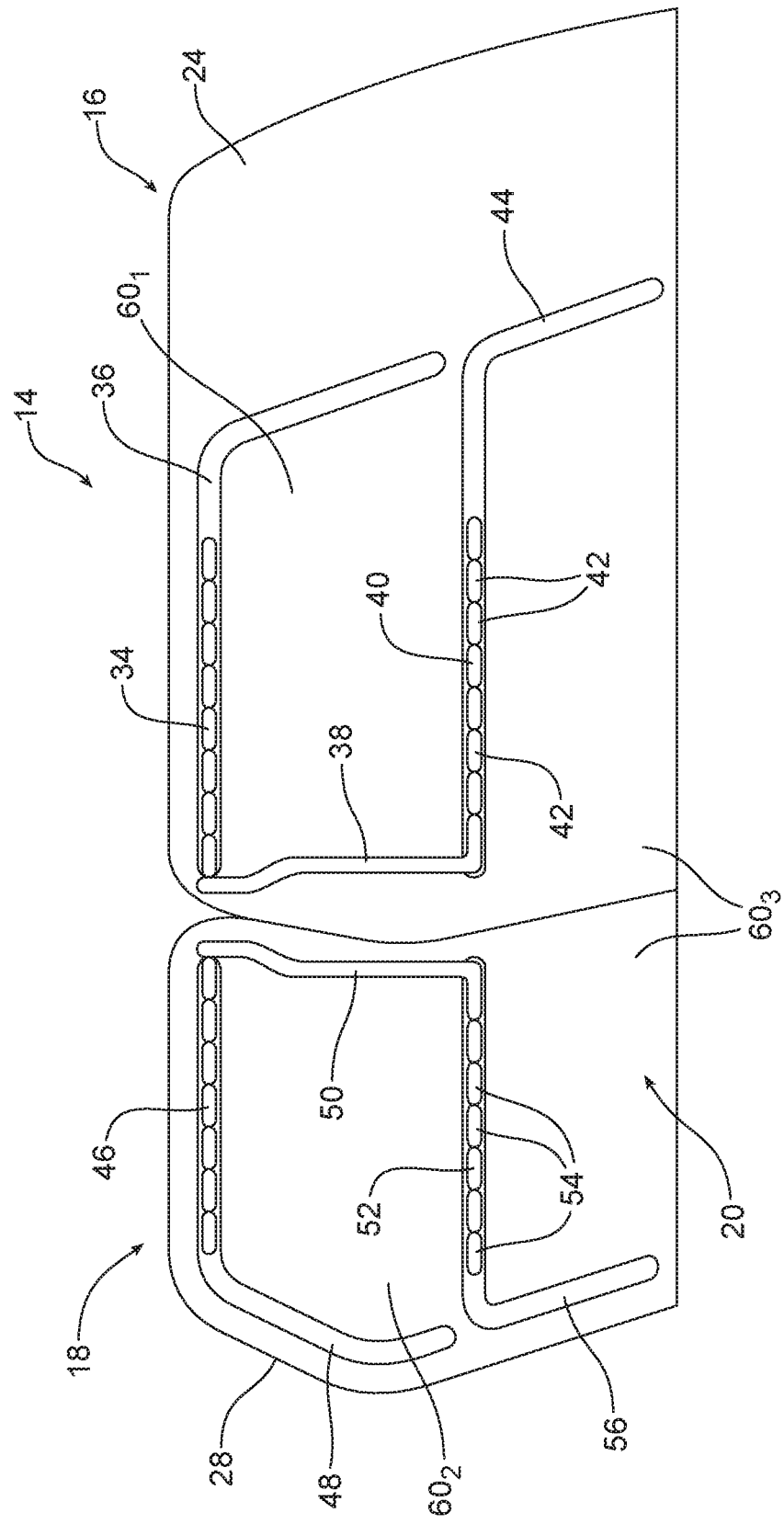
Figure 3B:
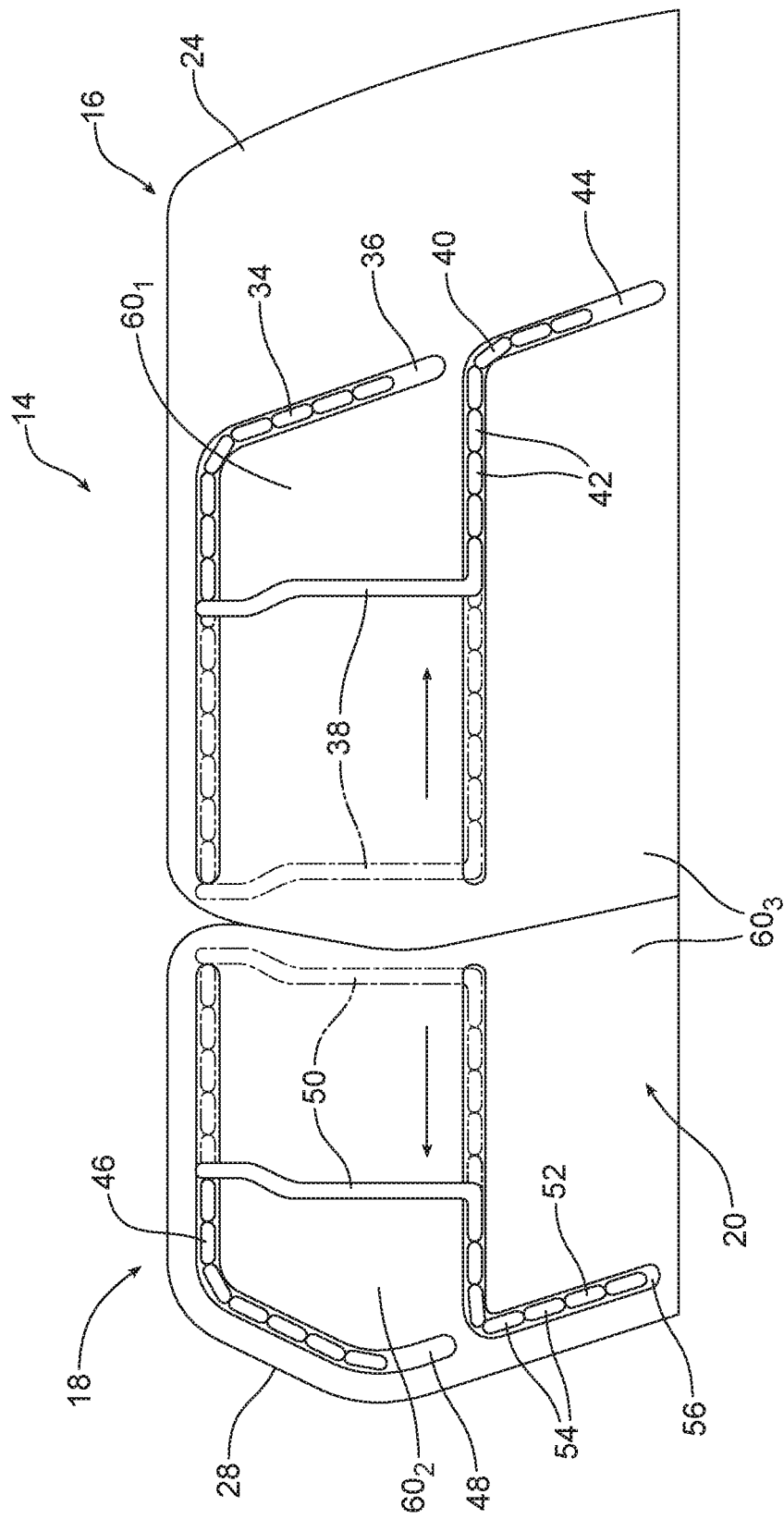

FIGS. 3a and 3b are schematic views of the first section and the second section of the bin illustrating the guide tracks for the first door and the first retractable bin floor of the first partition and the second door and second retractable bin floor of the second partition. In FIG. 3a, the first door and the second door are shown in the closed position and the first retractable bin floor and the second retractable bin floor are shown in the deployed position. In FIG. 3b, the first and second doors are shown in the open position and the first and second retractable bin floors are shown in phantom line in the deployed position and in full line in the retracted position.

Figure 4:
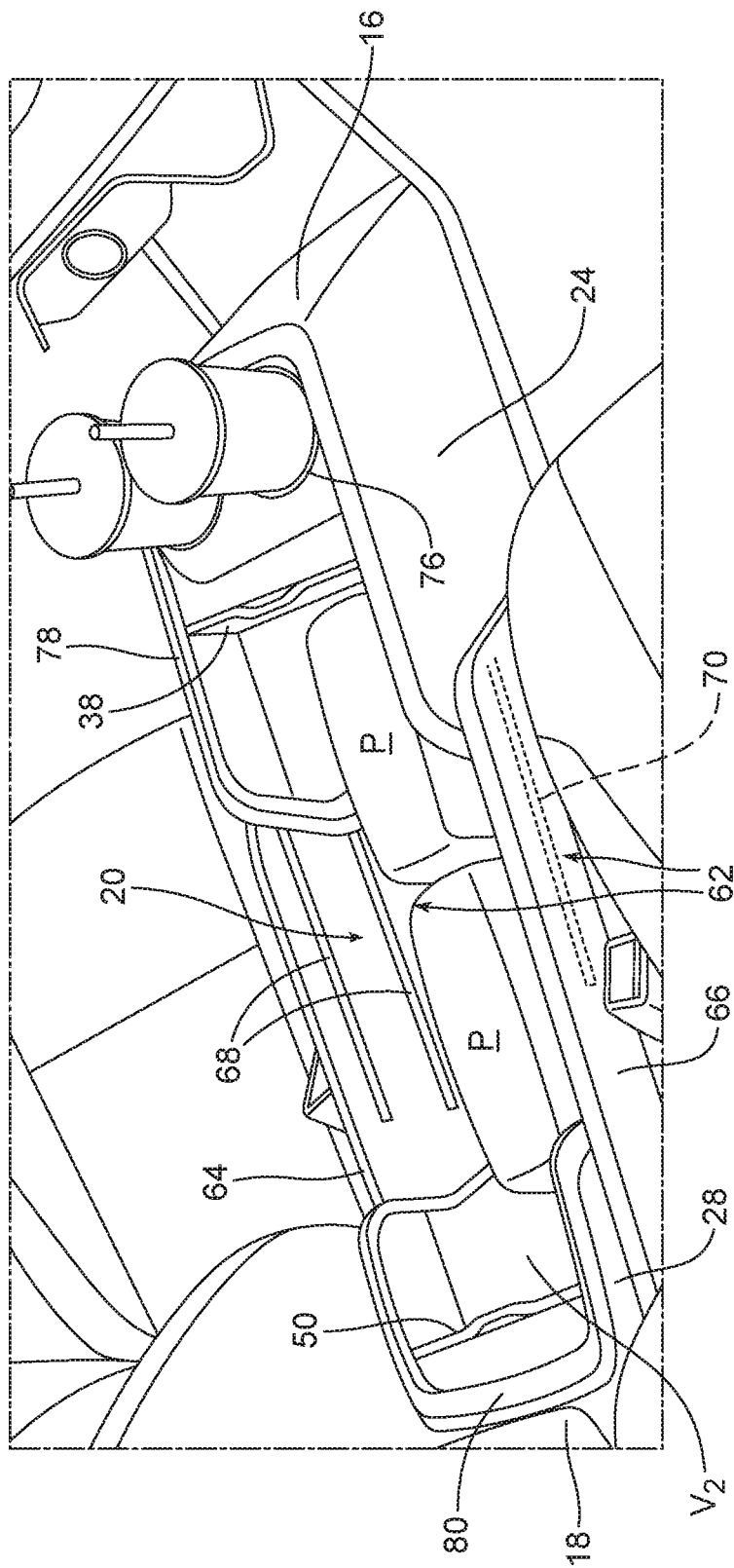

FIG. 4 is a perspective view of the console in a second configuration wherein the two sections of the console have been separated to their maximum extent and the two retractable bin floors have been fully retracted to provide for a storage compartment with a greater volume.

Reference will now be made in detail to the present preferred embodiments of the console, an example of which is illustrated in the accompanying drawing figures.

DETAILED DESCRIPTION

Reference is now made to the drawing figures illustrating a new and improved console 10 that advantageously allows a vehicle operator to reconfigure and tailor the console to meet the needs of the users across a broad range of applications. The console 10 includes a foundation or base 12 and a bin 14 that is supported on that base. The bin 14 is split and has a first section 16 and a second section 18 that function together to define a variable storage compartment 20.

In the illustrated embodiment the first section 16 comprises a first three-sided or U-shaped wall 24. Similarly, the second section 18 comprises a second three-sided or U-shaped wall 28. As illustrated, the open end 30 of the first U-shaped wall 24 is oriented toward the open end 32 of the second U-shaped wall 28.

As best illustrated in FIGS. 1a, 1b, 2a, 2b, 3a and 3b, the first section 16 of the bin 14 includes a first door 34 that is received in and slides along a second guide track 36 provided in the first U-shaped wall 24. Only one side of the second guide track 36 is illustrated in FIGS. 3a and 3b. In the illustrated embodiment, the first door 34 is a tambour door. The first door 34 is displaceable between a fully closed position illustrated in FIGS. 1a, 1b and 3a and a fully opened position illustrated in FIGS. 2a, 2b and 3b.

As further illustrated in FIGS. 2a, 2b, 3a and 3b, the first section 16 of the bin 14 also includes a first partition 38 that also includes a first retractable bin floor 40. In the illustrated embodiment, the first retractable bin floor 40 is made from a plurality of articulating segments 42.

The first retractable bin floor 40 is received in and slides along a third guide track 44 provided in the first U-shaped wall 24 generally below the second guide track 36. Only one side of the third guide track 44 is illustrated in FIGS. 3a and 3b. The first retractable bin floor 40 is displaceable between the fully deployed position, illustrated in FIGS. 2a and 3a in full line as well as FIG. 3b in phantom line, and a fully retracted position illustrated in FIGS. 2b and 3b in full line.

As best illustrated in FIGS. 1a, 1b, 2a, 2b, 3a and 3b, the second section 18 of the bin 14 includes a second door 46 that is received in and slides along a fourth track 48 provided in the second U-shaped wall 28. Only one side of the fourth guide track 48 is illustrated in FIGS. 3a and 3b. In the illustrated embodiment, the second door 46 is a tambour door. The second door 46 is displaceable between a fully closed position illustrated in FIGS. 1a, 1b and 3a and a fully opened position illustrated in FIGS. 2a, 2b and 3b.

As further illustrated in FIGS. 2a, 2b, 3a and 3b, the second section 18 of the bin 14 also includes a second partition 50 that also includes a second retractable bin floor 52. In the illustrated embodiment, the second retractable bin floor 52 is made from a plurality of articulating segments 54.

The second retractable bin floor 52 is received in and slides along a fifth guide track 56 provided in the second U-shaped wall 28 generally below the fourth guide track 48. Only one side of the fifth guide track 56 is illustrated in FIGS. 3a and 3b. The second retractable bin floor 52 is displaceable between the fully deployed position, illustrated in FIGS. 2a and 3a in full line and FIG. 3b in phantom line, and a fully retracted position illustrated in FIGS. 2b and 3b in full line.

Figure 1A:
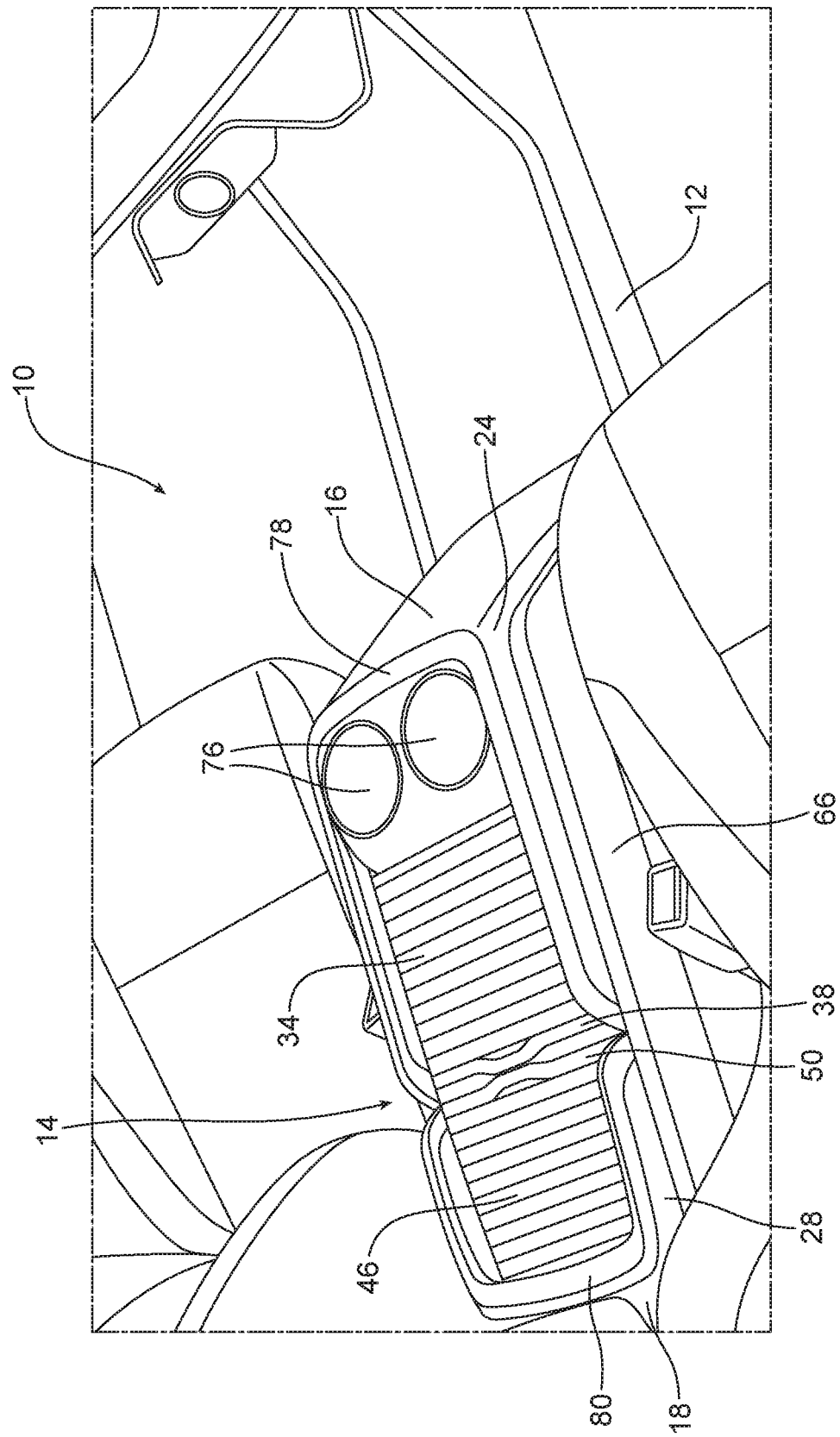
FIG. 1a is a detailed perspective view of the console in a first configuration showing the sliding doors of the console in a closed position.
Figure 2A:
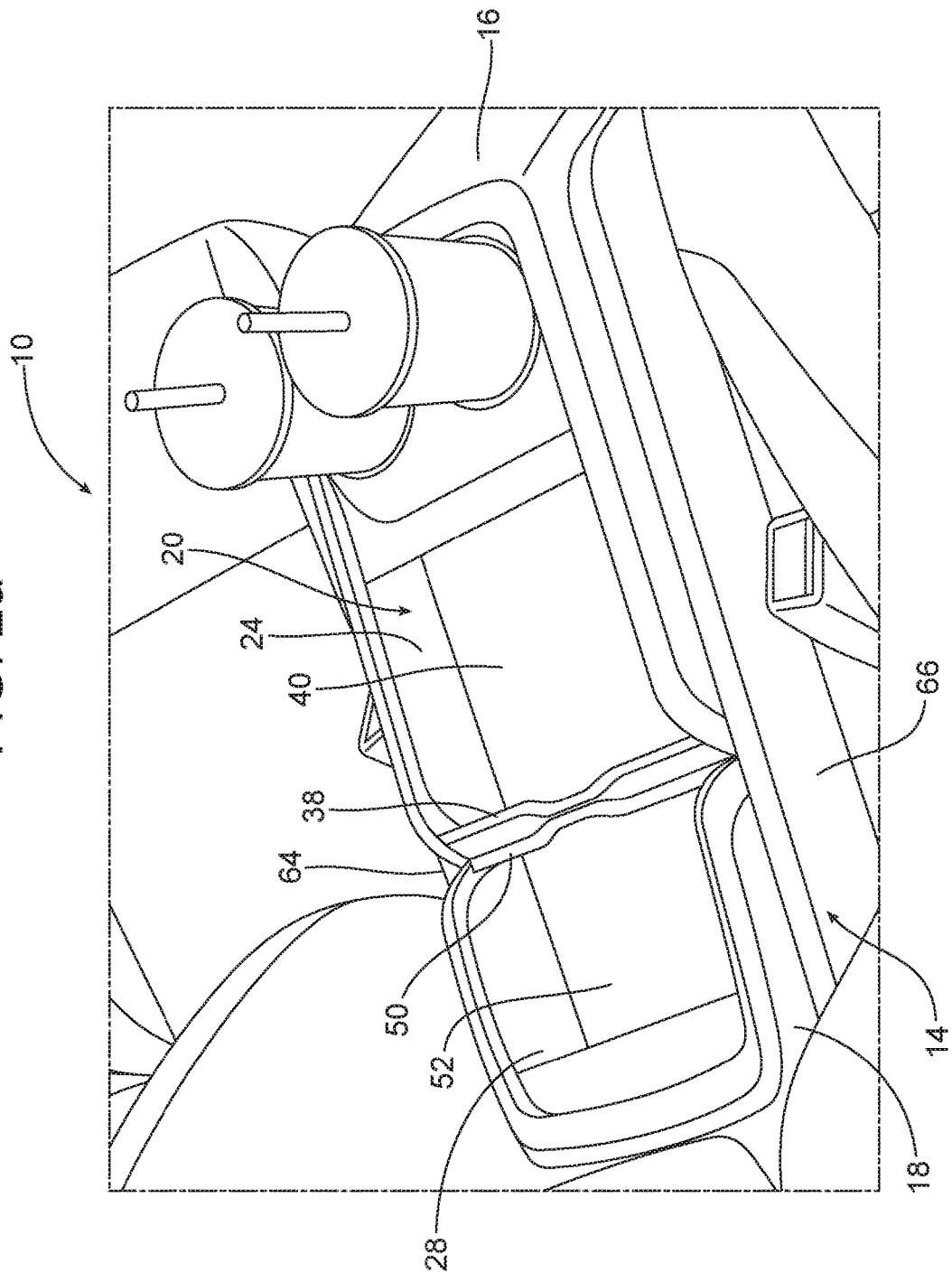
FIG. 2a is a view of the console similar to FIG. 1a but illustrating the sliding doors in an open position and the two partitions in the variable volume storage compartment in a first or deployed position.

In the illustrated embodiment, the first door 34 and the second door 46 open in opposite directions toward the opposed ends of the first section 16 and second section 18. Note FIG. 1a showing the doors 34, 46 in the closed position and FIG. 2a showing the doors in the opened position. FIG. 2a illustrates the first partition 38 and first retractable bin floor 40 and the second partition 50 and second retractable bin floor 52 in the deployed positions so as to divide the entire storage compartment 20 into three separate storage chambers $60_1$, $60_2$, $60_3$.

The first smaller, upper chamber $60_1$ is defined between the first door 34, the first U-shaped wall 24, the first partition 38 and the first retractable bin floor 40. This chamber $60_1$ is accessed by opening the first door 34.

The second smaller, upper chamber $60_2$ is defined between the second door 46, the second U-shaped wall 28, the second partition 50 and the second retractable bin floor 52. This chamber $60_2$ is accessed by opening the second door 46.

Figure 2B:
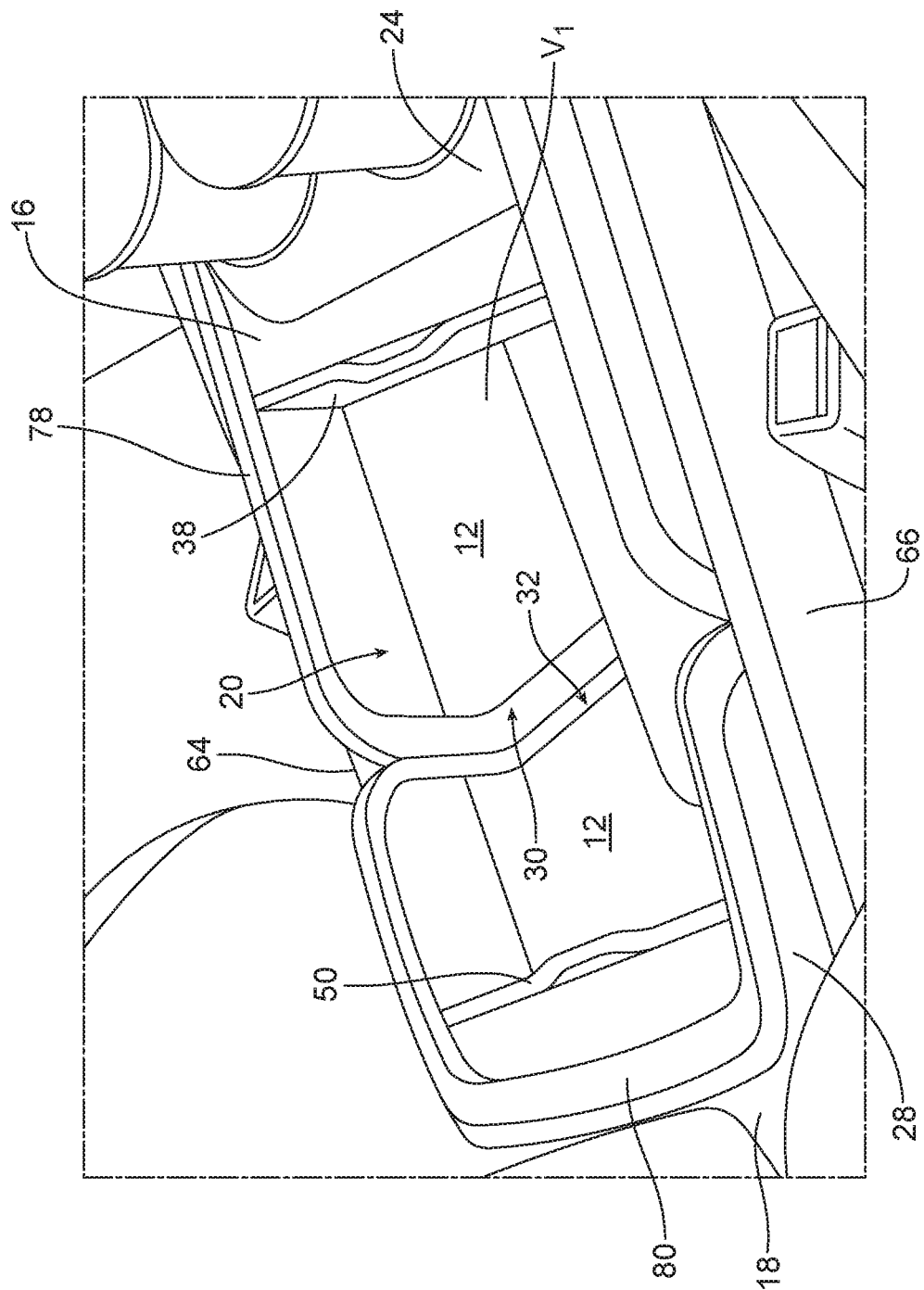
FIG. 2b is a view similar to FIG. 2a but illustrating the partitions in a second or retracted position.

The third larger, lower chamber $60_3$ is defined between the first U-shaped wall 24, the second U-shaped wall 28, the two retractable bin floors 40, 52 and the base 12. See also FIG. 3a. This third chamber $60_3$ is concealed from view when the first and second retractable bin floors 40, 52 are deployed as illustrated in FIG. 2a and is only accessible when one or both retractable bin floors are retracted as illustrated in FIG. 2b.

In the illustrated embodiment, the first section 16 of the bin 14 engages and slides along a first guide track 62 between a first position illustrated in FIGS. 1a, 1b, 2a and 2b, defining a first storage compartment volume $V_1$ and a second position, illustrated in FIG. 4 defining a second storage compartment volume $V_2$ where $V_2>V_1$. Two larger packages P are illustrated in the storage compartment 20 in FIG. 4.

As should be further appreciated from viewing the drawing Figures, the base 12 also includes a first sidewall 64 and a second sidewall 66. The bin 14, including the first section 16 and second section 18, are supported on the base 12 between the first sidewall 64 and the second sidewall 66. In other words the bin 14 is provided on the base 12 inboard of the outboard first sidewall 64 and second sidewall 66. In the illustrated embodiment, the first guide track 62 includes two sets of opposed guides 68, 70. Guide set 68 is provided on the first sidewall 64 while guide set 70 is provided on the second sidewall 66. Each of the guide sets 68, 70 of the first guide track 62 includes distinct detents (not shown) that allow the first section 16 of the bin 14 to be moved into various positions for adjustment of the volume of the storage compartment 20 into various sizes. FIG. 4 illustrates the storage compartment 20 in the fully expanded configuration. As should be appreciated, the first sidewall 64 and second sidewall 66 allow one to reposition the first section 16 of the center console 10 without losing sidewall containment of the variable volume storage compartment 20.

Figure 1B:
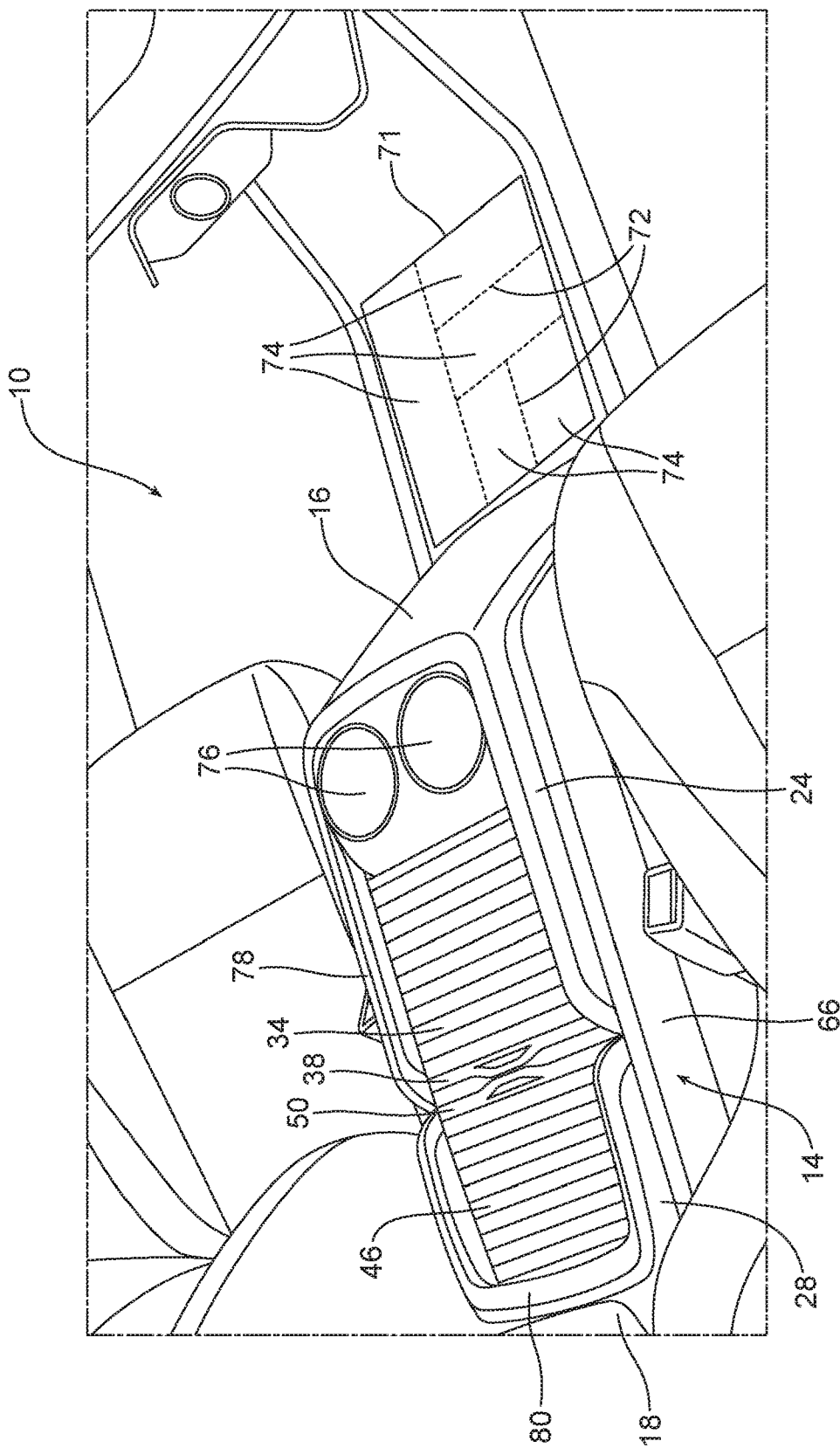
FIG. 1b is a perspective view similar to FIG. 1a but illustrating an alternative embodiment of console incorporating a recessed storage tray at a forward end of the base thereof.

As illustrated in FIG. 1b, the base 12 may also include a recessed storage compartment 71 at a forward end of the base. That recessed storage compartment 71 may include a number of dividers 72 to divide the recessed storage compartment 71 into multiple compartments 74. Those dividers 72 may be adjustable if desired. When the first section 16 of the bin 14 is displaced into the second position illustrated in FIG. 4, that section 16 overlies the recessed storage compartment 71.

In the illustrated embodiment, the second section 18 of the bin 14 is fixed to the base 12 at the rear end of the base. It should be appreciated that in some embodiments, the second section 18 of the bin 14 may also be made adjustable along a guide track in the manner of the first section 16 described above.

The illustrated embodiment of the console 10 also includes two cup holder wells 76 provided in the upper surface of the first section 16 of the bin 14. Here it should be appreciated that other convenience features may be provided. For example the first section 16 could include a single cup holder well 76 and a second compartment sized and shaped to receive and hold a cell phone.

The illustrated embodiment also includes a raised perimeter rail 78 along the top of the first U-shaped wall 24 and a raised perimeter rail 80 along the top of the second U-shaped wall 28. As illustrated in FIG. 2a, when the first section 12 is in the first position adjacent the second section 18, these perimeter rails 78, 80 function as raised sidewalls allowing the closed doors 34, 46 to function as a tray for holding a drive-through beverage carrier or the like: the rails function to prevent that beverage carrier from sliding off of the console 10.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. A console, comprising:
   a base; and
   a bin supported on said base, said bin having a first section and a second section, said first section including a first U-shaped wall having a first open end, said second section including a second U-shaped wall having a second open end, said first open end being oriented toward said second open end whereby said first section and said second section define a variable volume storage compartment.
2. The console of claim 1, wherein said base includes a first guide track and said first section engages and slides along said first guide track between a first position defining a first storage compartment volume and a second position defining a second storage compartment volume.
3. The console of claim 2, wherein said base includes a first sidewall and a second sidewall.
4. The console of claim 3, wherein said bin is supported on said base between said first sidewall and said second sidewall.
5. The console of claim 4, wherein said first section includes a first partition.
6. The console of claim 5, wherein said first section includes a first door.
7. The console of claim 6, wherein said second section includes a second partition.
8. The console of claim 7, wherein said second section includes a second door.
9. The console of claim 8, wherein said first door slides in a second guide track carried on said first U-shaped wall.
10. The console of claim 9, wherein said second door slides in a third guide track carried on said second U-shaped wall.
11. The console of claim 10, further including a recessed storage compartment on said base.
12. The console of claim 11, wherein said first partition includes a first retractable bin floor.
13. The console of claim 12, wherein said second partition includes a second retractable bin floor.
14. The console of claim 13 wherein said first retractable bin floor slides along a fourth guide track in said first section of said bin.
15. The console of claim 14, wherein said second retractable bin floor slides along a fifth guide track in said second section of said bin.
16. The console of claim 15, wherein said first retractable bin floor and said second retractable bin floor are both made from a plurality of articulating segments.
17. The console of claim 1, wherein said base includes a first sidewall and a second sidewall and said bin is supported on said base between said first sidewall and said second sidewall.

\* \* \* \* \*